(12) United States Patent
Wagoner et al.

(10) Patent No.: US 9,136,709 B2
(45) Date of Patent: Sep. 15, 2015

(54) METHODS AND SYSTEMS FOR SELECTIVELY COUPLING A POWER CONVERSION SYSTEM TO AN ELECTRICAL GRID

(75) Inventors: Robert Gregory Wagoner, Roanoke, VA (US); David Smith, Daleville, VA (US); Anthony William Galbraith, Wirtz, VA (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 13/282,069

(22) Filed: Oct. 26, 2011

(65) Prior Publication Data

US 2013/0107594 A1     May 2, 2013

(51) Int. Cl.
*H02M 7/537* (2006.01)
*H02J 3/38* (2006.01)

(52) U.S. Cl.
CPC . *H02J 3/383* (2013.01); *H02J 3/38* (2013.01); *H02M 7/537* (2013.01); *Y02E 10/563* (2013.01)

(58) Field of Classification Search
CPC ...................................................... H02J 3/383
USPC ......... 363/95, 96, 97, 98, 99, 35, 40, 55, 109; 307/48, 51, 52, 65, 87
See application file for complete search history.

(56) References Cited

U.S. PATENT DOCUMENTS

| 5,801,519 | A | 9/1998 | Midya et al. |
| 2005/0110454 | A1 | 5/2005 | Tsai et al. |
| 2007/0103108 | A1 | 5/2007 | Capp et al. |
| 2009/0121549 | A1* | 5/2009 | Leonard ......................... 307/51 |
| 2009/0283128 | A1 | 11/2009 | Zhang et al. |
| 2010/0264736 | A1* | 10/2010 | Mumtaz et al. ................. 307/48 |
| 2012/0039101 | A1* | 2/2012 | Falk et al. ........................ 363/95 |

OTHER PUBLICATIONS

Barbosa et al., Novel Control Strategy for Grid-Connected DC-AC Converters with Load Power Factor and MPPT Control, Federal University of Rio de Janeiro, Department of Electrical Engineering, www.solar.coppe.ufrj, 13 pages.
EP Partial Search Report dated Feb. 28, 2013 from corresponding EP Application No. 12189378.8.

* cited by examiner

*Primary Examiner* — Matthew Nguyen
*Assistant Examiner* — Trinh Dang
(74) *Attorney, Agent, or Firm* — Armstrong Teasdale LLP

(57) ABSTRACT

A power conversion system for providing power to an electrical grid is described. The system includes a power converter coupled to a direct current (DC) power source. The system also includes a contactor coupled to the power converter and the electrical grid and configured to selectively electrically couple the power converter to the electrical grid. The system also includes a system controller communicatively coupled to the power converter and the contactor and configured to close the contactor to electrically couple the power converter to the electrical grid and to activate the power converter when a DC voltage provided has remained higher than a voltage level for a length of time. The system controller is also configured to deactivate the power converter, while the contactor is maintained in the closed position, when an alternating current (AC) power output has remained lower than a power level for a length of time.

14 Claims, 3 Drawing Sheets

METHODS AND SYSTEMS FOR SELECTIVELY COUPLING A POWER CONVERSION SYSTEM TO AN ELECTRICAL GRID

BACKGROUND OF THE INVENTION

The embodiments described herein relate generally to operating a power conversion system, and more specifically, to controlling the power conversion system to provide a predefined power to an electrical grid.

Solar energy has increasingly become an attractive source of energy and has been recognized as a clean, renewable alternative form of energy. Solar energy in the form of sunlight may be converted to electrical energy by solar cells. A more general term for devices that convert light to electrical energy is "photovoltaic cells." Solar cells are a subset of photovoltaic (PV) cells.

In order to obtain a higher current and voltage, solar cells are electrically connected to form a solar module. In addition to a plurality of solar cells, the solar module may also include sensors, for example, an irradiance sensor, a temperature sensor, a voltage meter, a current meter, and/or a power meter. Solar modules may also be connected to form a module string. Typically, the direct current (DC) voltages output by the module strings are provided to a power converter, for example, a DC to alternating current (AC) voltage inverter. The DC to AC voltage inverter converts the DC voltage to three-phase AC voltage or current. The three-phase AC output from the DC to AC inverter is provided to a power transformer, which outputs a three-phase high-voltage AC power to an electrical grid. An AC contactor selectively electrically couples the power converter and the electrical grid.

Typically, an operator of a power generation system coupled to an electrical grid agrees to supply the electrical grid with a defined level of power. It is financially beneficial for the operator to supply power to the electrical grid for as much of each day as possible. As the sun rises, the PV array voltage increases. Once the PV array voltage reaches a predefined level, the power converter is activated, the AC contactor is closed to couple the power converter and the electrical grid, and the power generation system attempts to supply power to the electrical grid. If the PV array is not able to provide the defined level of power, for example, if the irradiance level is not high enough to support the defined level of power, the AC contactor is opened, which disconnects the power converter from the electrical grid. Typically, the AC contactor remains open for a predefined length of time before it is closed to once again attempt to supply power to the electrical grid. This process is repeated until the PV array is able to support the defined level of power. A similar process may be repeated as the sun sets. The cycling on and off of the AC contactor causes wear and reduces the useful life of the AC contactor.

BRIEF DESCRIPTION OF THE INVENTION

In one aspect, a power conversion system for providing power to an electrical grid is provided. The system includes a power converter coupled to and configured to receive power generated by a direct current (DC) power source. The system also includes a contactor coupled to the power converter and the electrical grid and configured to selectively electrically couple the power converter to the electrical grid. The system also includes a system controller communicatively coupled to the power converter and the contactor and configured to close the contactor to electrically couple the power converter to the electrical grid and to activate the power converter when a DC voltage provided to the power converter has remained higher than a predefined voltage level for a predefined length of time. The system controller is also configured to deactivate the power converter, while maintaining the contactor in the closed position, when an alternating current (AC) power output of the power converter has remained lower than a predefined power level for a predefined length of time.

In another aspect, a method for operating a power conversion system is provided. The power conversion system includes a power converter and a contactor configured to selectively electrically couple the power converter to an electrical grid. The method includes determining that a direct current (DC) voltage provided to the power converter has remained higher than a predefined voltage level for a predefined length of time. The method also includes closing the contactor to electrically couple the power converter to the electrical grid and activating the power converter to convert the DC voltage input to an alternating current (AC) voltage output. The method also includes determining an AC power output of the power converter and discontinuing operation of the power converter, while maintaining the contactor in the closed position, when the AC power output has remained lower than a predefined power level for a predefined length of time.

In yet another aspect, a system controller coupled to, and configured to control operation of, a power conversion system that includes a power converter coupled to a photovoltaic (PV) array and a contactor configured to selectively electrically couple the power converter to an electrical grid is provided. The system controller is configured to determine an AC power output of the power converter and discontinue operation of the power converter when the AC power is less than a predefined power level.

DETAILED DESCRIPTION OF THE INVENTION

The methods and systems described herein facilitate controlling a power conversion system included within a power generation system to provide power to an electrical grid when the power provided is above a predefined level. The methods and systems described herein maximize the amount of time the power generation system provides power to the electrical grid while reducing wear and increasing a useful life of a contactor that selectively electrically couples the power conversion system and the electrical grid.

Technical effects of the methods and systems described herein include at least one of: (a) determining that a direct current (DC) voltage provided to the power converter has remained higher than a predefined voltage level for a predefined length of time; (b) closing a contactor to electrically couple the power converter to the electrical grid; (c) activating the power converter; (d) determining an AC power output of the power converter; and (e) discontinuing operation of the power converter, while maintaining the contactor in the closed position, when the AC power output has remained lower than a predefined power level for a predefined length of time.

Figure 1:
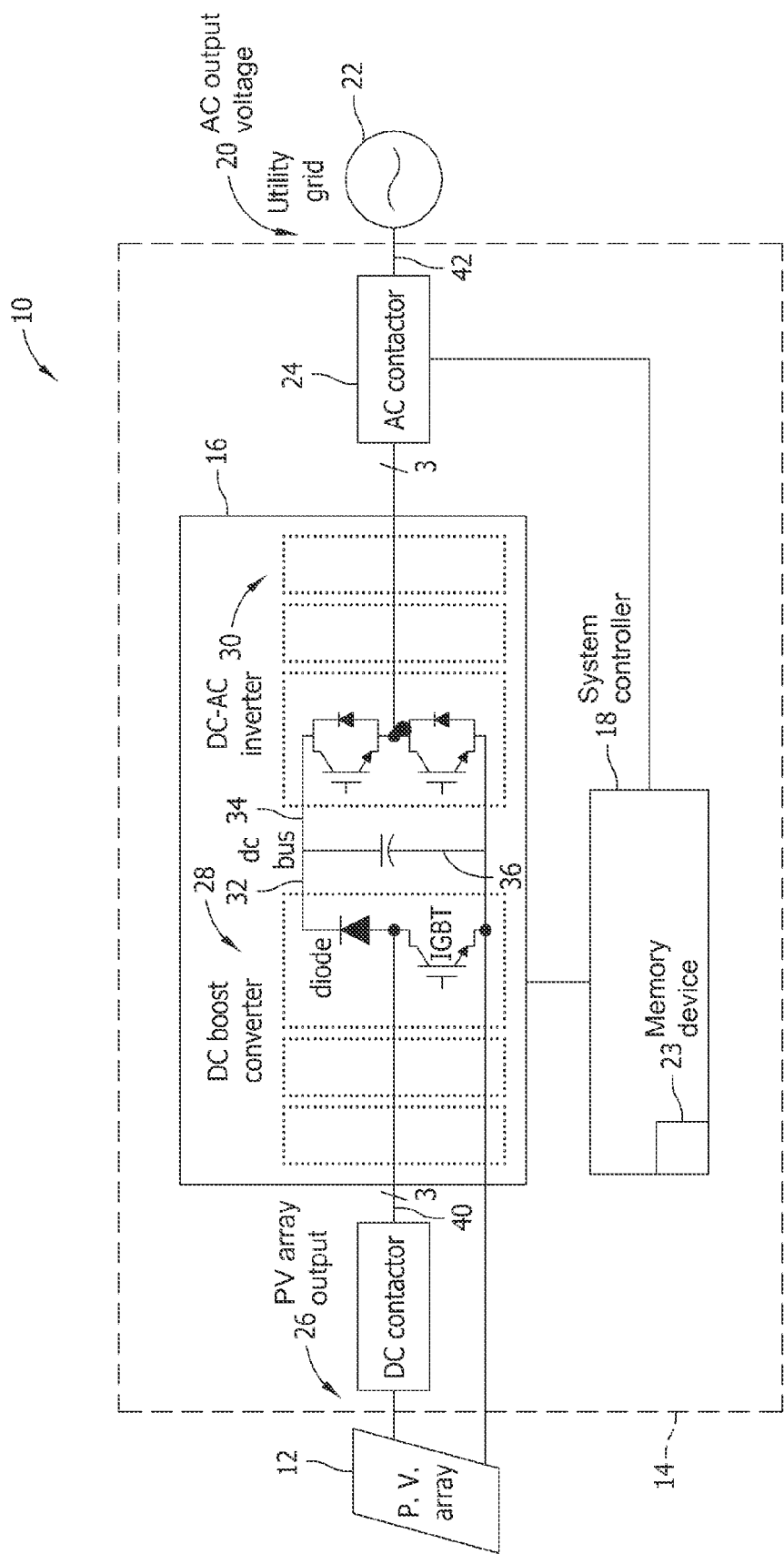
FIG. 1 is a block diagram of an exemplary power generation system that includes a power conversion system.

FIG. 1 is a block diagram of an exemplary embodiment of a photovoltaic (PV) power generation system 10. In the exemplary embodiment, PV power generation system 10 includes a PV array 12 and a power conversion system 14. In the exemplary embodiment, power conversion system 14 includes a power converter 16 and a system controller 18. System 10 is configured to provide an alternating current (AC) output voltage 20 for delivery to a load, for example, but not limited to, a transformer or an electrical grid 22. Electrical grid 22 may include an electrical distribution grid, an electrical transmission grid, or any type of electrical grid configured for delivering electricity. PV array 12 includes at least one PV cell (not shown in FIG. 1), for example, at least one solar cell. Although described herein as receiving power generated by PV array 12, two-stage power converter 16 may be provided with power from any suitable DC source that allows system 10 to function as described herein.

In the exemplary embodiment, system controller 18 includes, or is coupled to, a memory device 23. System controller 18 is included within, or is coupled to, power converter 16 and is configured to control operation of power converter 16. For example, system controller 18 may generate a converter control signal and provide the converter control signal to converter 16. Converter 16 operates in accordance with the converter control signal.

The embodiments described herein are not limited to any particular system controller and/or processor for performing the processing tasks described herein. The term "processor," as that term is used herein, is intended to denote any machine capable of performing the calculations, or computations, necessary to perform the tasks described herein. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments of the invention, as will be understood by those skilled in the art. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

In the exemplary embodiment, power conversion system 14 also includes a contactor 24 that selectively couples power converter 16 and electrical grid 22. Contactor 24 may include an AC contactor, a relay, and/or any suitable switching device that allows power generation system 10 to function as described herein. In the exemplary embodiment, system controller 18 is communicatively coupled to, and configured to control operation of, power converter 16 and contactor 24. For example, when the sun is rising and power converter 16 is inactive, system controller 18 receives a voltage signal corresponding to a PV array open-circuit voltage at an output 26 of PV array 12. Typically, this voltage signal is the only indication available to system controller 18 of the readiness of PV array 12 to supply power. The open-circuit voltage of PV array 12 is a function of irradiance and temperature.

In the exemplary embodiment, a first predefined PV array voltage level is stored, for example, in memory device 23. The first predefined PV array voltage level is a voltage that corresponds to an irradiance level that is high enough that PV array 12 provides power capable of overcoming losses within power converter 16. When system controller 18 determines that the PV array voltage has remained above the first predefined voltage level for a predefined length of time, contactor 24 is closed and power converter 16 is activated. The predefined length of time is also referred to herein as a wake timer and includes a predefined number of seconds and/or minutes stored within memory device 23. In the exemplary embodiment, the predefined period of time is between approximately one and ten minutes or, more specifically, two and eight minutes, or, even more specifically, is approximately five minutes.

When contactor 24 is closed and power converter 16 is activated, power generation system 10 attempts to supply power to electrical grid 22 at a level of power greater than a first predefined power level. The first predefined power level may be the defined level of power (i.e., the level of power the PV power generation system operator agreed to provide to the electrical grid) or any other level of power that allows power conversion system 14 to function as described herein. If the irradiance available to PV array 12 is not high enough to support the first predefined level of power, and the power output of power converter 16 remains below the first predefined level of power for a predefined length of time, contactor 24 is maintained in a closed position and system controller 18 discontinues operation of power converter 16 (i.e., turns-off power converter 16). Discontinuing operation of power converter 16 causes the power output of system 10 to go to zero. This predefined length of time may also be referred to herein as a sleep timer. In the exemplary embodiment, the predefined period of time is between approximately one and ten minutes or, more specifically, two and eight minutes, or, even more specifically, is approximately five minutes. The length of the sleep timer and the length of the wake timer may be the same or may be different.

Power conversion system 14 is referred to as in a sleep mode when waiting to attempt to provide grid 22 with power. System controller 18 continues to monitor the PV array voltage to determine when to next attempt to supply power to electrical grid 22. This process of activating and deactivating power converter 16 is repeated until power generation system 10 is able to support the defined level of power.

Once system 10 is able to support the defined level of power, power converter 16 remains "ON" (i.e., is activated and providing power to electrical grid 22) until the power supported by the present irradiance decreases to less than the first predefined level of power and remains lower than the first predefined level of power for a predefined period of time (i.e., the sleep timer expires). For example, as the sun sets, the irradiance level available to PV array 12 decreases, causing a reduction in the output power supported by PV array 12. When system controller 18 determines system 10 is not able to support the first predefined level of power, system controller 18 discontinues operation of power converter 16, which causes the power output of system 10 to go to zero (i.e., power conversion system 14 returns to sleep mode). For example, system controller 18 may determine system 10 is not able to support the first predefined level of power when the power output of system 10 is less than the first predefined level of power for a length of time that exceeds the sleep timer.

System controller 18 also monitors a length of time contactor 24 is closed, also referred to herein as a contactor-open delay. Contactor 24 will not be opened prior to expiration of the contactor-open delay. In the exemplary embodiment, the contactor-open delay is between approximately fifteen and forty-five minutes or, more specifically, twenty and forty minutes, or, even more specifically, is approximately thirty minutes. If the PV array voltage has decreased to less than the predefined voltage level, and remains below the PV array voltage level for a length of time that exceeds the wake timer, contactor 24 remains closed until the expiration of the contactor-open delay. Once the contactor-open delay has expired, contactor 24 is opened, which electrically disconnects power converter 16 from electrical grid 22.

Controlling operation of power converter 16, rather than cycling on and off contactor 24, reduces wear to contactor 24. Reducing wear to contactor 24 increases a useful life of contactor 24, which reduces maintenance costs and other costs associated with replacement of contactor 24.

In the exemplary embodiment, power converter 16 is a two-stage power converter that includes a DC to DC boost converter 28 and a DC to AC inverter 30. Although illustrated as a two-stage power converter, power generation system 10 may include a single-stage power converter, a multiple-stage power converter, and/or any suitable power converter that allows system 10 to function as described herein. In the exemplary embodiment, system controller 18 is configured to independently control operation of boost converter 28 and inverter 30. System controller 18 is configured to determine a power operating point that is provided to two-stage power converter 16 for controlling operation of two-stage power converter 16. For example, a maximum power point (MPP) may be determined by system controller 18 using a process referred to as maximum power point tracking (MPPT). System controller 18 provides a power operating point signal corresponding to the maximum power point to boost converter 28, and in response, boost converter 28 is configured to extract a maximum power available from PV array 12.

An output 32 of boost converter 28 is coupled to an input 34 of inverter 30 by at least one conductor, for example, a DC bus 36. PV array 12 is coupled to two-stage power converter 16 through at least one conductor 40, and inverter 30 is coupled to electrical grid 22 through at least one conductor 42. Although illustrated as single lines, conductor 40, conductor 42, and DC bus 36 may include any number of separate conductors that allows system 10 to function as described herein. For example, if PV power generation system 10 is a single phase system, conductor 40, conductor 42, and DC bus 36 may each include a single conductor. Alternatively, if PV power generation system 10 is a three phase system, conductor 40, conductor 42, and DC bus 36 may each include three separate conductors, one for each phase. Furthermore, PV power generation system 10 may include any suitable number of phases. A DC bus voltage is controlled by inverter 30, as it passes through whatever level of power is provided by boost converter 28. Inverter 30 also regulates the AC output current (real and reactive). More specifically, system controller 18 controls operation of inverter 30 to control the DC bus voltage and/or to control a power factor of AC voltage 20 output by inverter 30 and provided to electrical grid 22.

Figure 2:
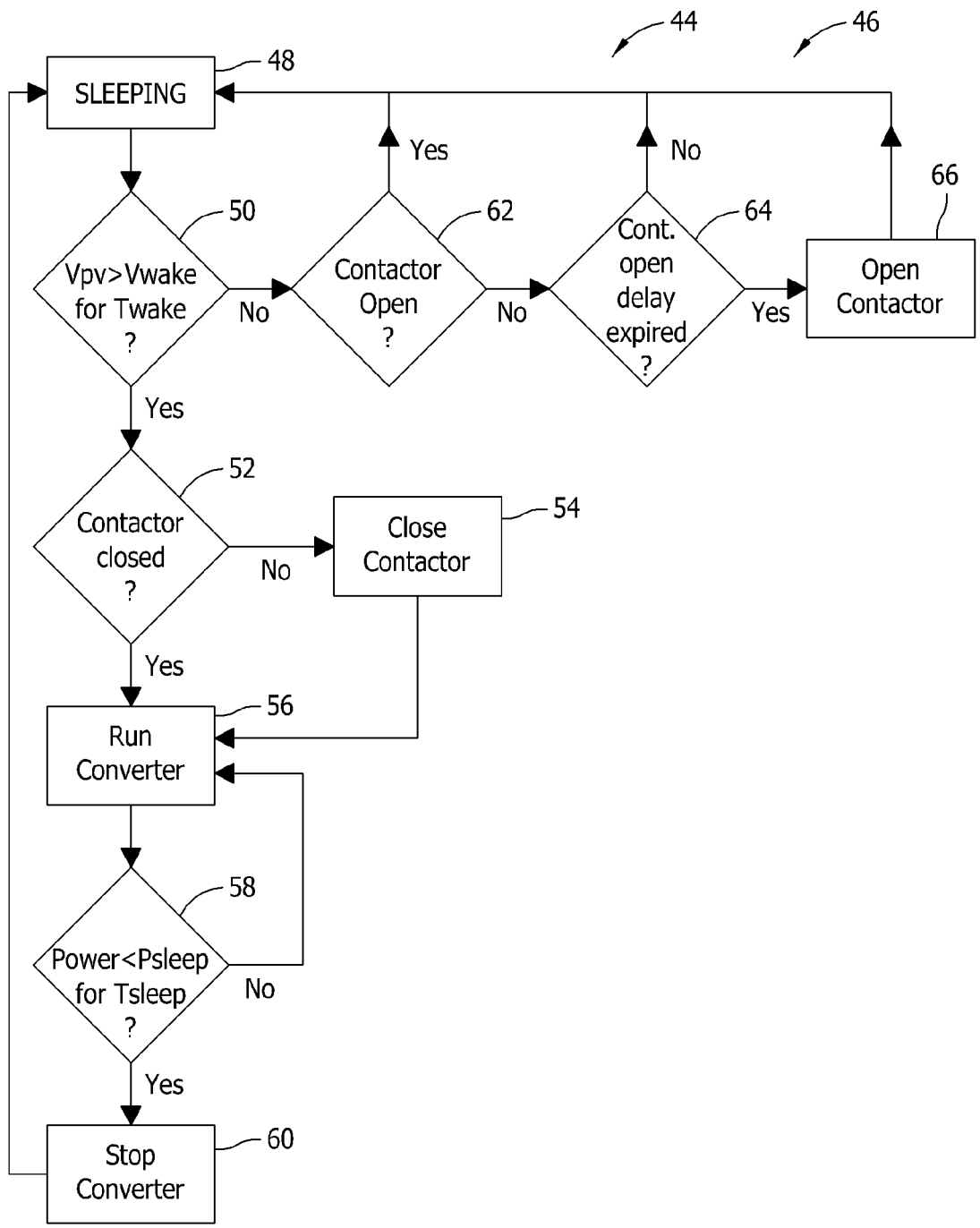
FIG. 2 is a first flow chart of an exemplary method for operating the power conversion system shown in FIG. 1.

FIG. 2 is a first flow chart 44 of an exemplary method 46 for operating a power conversion system, for example, power conversion system 14 (shown in FIG. 1). In the exemplary embodiment, method 46 begins with a power converter, for example, power converter 16 (shown in FIG. 1), in an inactive state 48, also referred to herein as "OFF" or in a "sleep mode." In the exemplary embodiment, system controller 18 determines 50 whether a PV array voltage is greater than a stored voltage level corresponding to a voltage level at which power converter 16 will be activated. If system controller 18 determines 50 that the PV array voltage is higher than the stored voltage level, and has remained higher than the stored voltage level for longer than a predefined length of time (i.e., wake timer), system controller 18 determines 52 if a contactor, for example, contactor 24 (shown in FIG. 1) is closed. If system controller 18 determines 52 that contactor 24 is not closed, system controller 18 closes 54 contactor 24. If system controller 18 determines 52 that contactor 24 is closed, or after system controller 18 closes 54 contactor 24, system controller activates 56 power converter 16.

In the exemplary embodiment, system controller 18 determines 58 whether a power output of power converter 16 is greater than a stored power level. If the power output of power converter 16 is greater than the stored power level, power converter 16 remains activated (i.e., remains running). If the power output of power converter 16 is lower than the stored power level, and has remained lower than the stored power level for longer than a predefined length of time (i.e., sleep timer), power converter 16 is deactivated 60 (i.e., is turned "OFF"). When power converter 16 is deactivated 60, system controller 18 returns power converter 16 to inactive state 48.

In the exemplary embodiment, if system controller 18 determines 50 that the PV array voltage is less than the stored voltage level, system controller 18 determines 62 if contactor 24 is open. If contactor 24 is open, power converter 16 remains in inactive state 48. If contactor 24 is closed, system controller 18 determines 64 if a contactor-open delay has expired. If the contactor-open delay has not expired, power converter 16 remains in inactive state 48 and contactor 24 is maintained in the closed position. If the contactor-open delay has expired, system controller 18 opens 66 contactor 24 and power converter 16 remains in inactive state 48. The contactor-open delay allows power conversion system 14 to cycle through waking and/or sleeping without repeatedly cycling contactor 24 between open and close.

Figure 3:
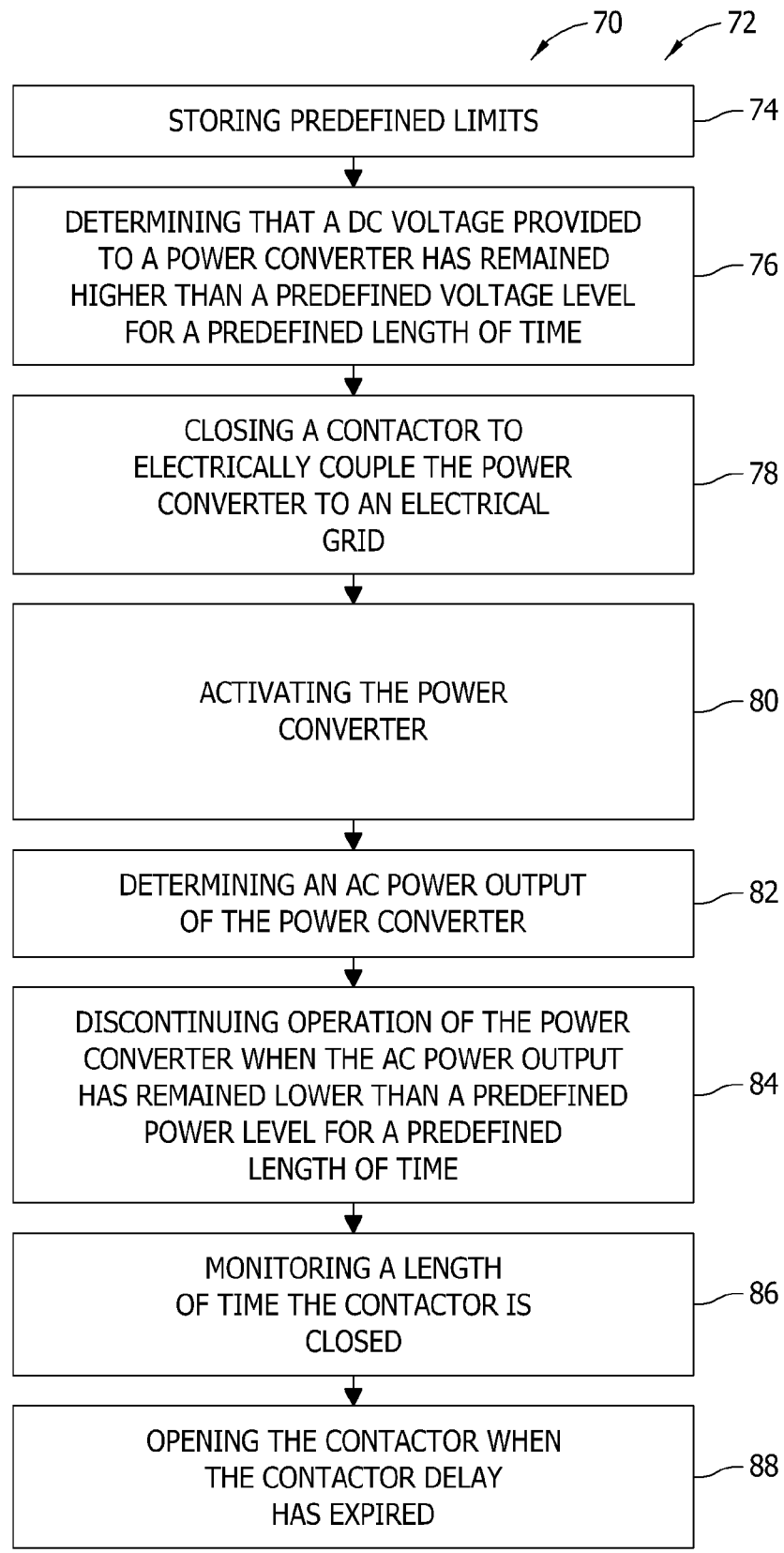
FIG. 3 is a second flow chart of an exemplary method for operating the power conversion system shown in FIG. 1.

FIG. 3 is a second flow chart 70 of an exemplary method 72 for operating a power conversion system, for example, power conversion system 14 (shown in FIG. 1). In the exemplary embodiment, method 72 may include storing 74 in a memory device, for example, memory device 23 (shown in FIG. 1), predefined limits that may include, but are not limited to, a predefined voltage level and a predefined power level. In the exemplary embodiment, method 72 includes determining 76 that a DC voltage provided to a power converter, for example, power converter 16 (shown in FIG. 1), has remained higher than the predefined voltage level for a predefined length of time. A system controller, for example, system controller 18 (shown in FIG. 1), may determine 76 whether the DC voltage provided to power converter 16 is suitable to attempt to provide power to an electrical grid, for example, electrical grid 22 (shown in FIG. 1). More specifically, system controller 18 may determine 76 whether a DC bus voltage has remained higher than the predefined voltage level for the predefined length of time.

In the exemplary embodiment, method 72 also includes closing 78 a contactor, for example, contactor 24 (shown in FIG. 1), to electrically couple power converter 16 to an electrical grid, for example, electrical grid 22 (shown in FIG. 1). For example, system controller 18 provides a signal to contactor 24 when the DC voltage provided to power converter 16 has remained higher than the predefined voltage level for the predefined length of time. Contactor 24 closes 78 in response to the signal. In the exemplary embodiment, method 72 also includes activating 80 power converter 16 to convert the DC voltage input to an AC voltage output.

In the exemplary embodiment, method 72 also includes determining 82 an AC power output of power converter 16. For example, system controller 18 may determine 82 the AC power output of power converter 16. Method 72 also includes discontinuing 84 operation of power converter 16, while maintaining contactor 24 in the closed position, when the AC power output is less than a predefined power level, for example, the predefined power level stored in memory device 23. For example, discontinuing 84 operation of power converter 16 may include turning-off power converter 16 after determining the AC power output of power converter 16 has remained lower than the predefined power level for a predefined length of time (i.e., sleep timer). The predefined period of time may also be stored in memory device 23.

Method 72 also includes monitoring 86 a length of time contactor 24 is closed, also referred to herein as a contactor-open delay. Contactor 24 will not be opened prior to expiration of the contactor-open delay. If the PV array voltage has decreased to less than the predefined voltage level, and remains below the predefined voltage level for a length of time that exceeds the wake timer, contactor 24 remains closed until the expiration of the contactor-open delay. Method 72 also includes opening 88 contactor 24 when the contactor-open delay has expired, which electrically disconnects power converter 16 from electrical grid 22.

Furthermore, one or more computer-readable media having computer-executable components, may be configured for controlling operation of power conversion system 14. The computer-executable components may include: an interface component that, when executed by at least one processor, causes the at least one processor to receive at least one of a voltage measurement signal, a current measurement signal, and a power measurement signal; a memory component that, when executed by at least one processor, causes the at least one processor to store at least one algorithm for determining when to provide power to the electrical grid; and an analysis component that, when executed by at least one processor, causes the at least one processor to generate operating signals that control operation of the power conversion system.

The embodiments described herein embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Described herein are exemplary methods and systems for operating a power conversion system. The methods and systems described herein improve the reliability of an AC contactor by significantly decreasing the number of operations. During wake up and sleep cycles as the sun is rising in the morning and setting in the evening, the AC contactor is held "ON" (i.e., closed) for a longer period of time (e.g., thirty minutes) than the normal wake/sleep timers (e.g., five minutes). During this mode of operation, instead of cycling the AC contactor to selectively provide power to the electrical grid, the DC-AC inverter is operated to selectively provide power to the electrical grid.

The methods and systems described herein facilitate efficient and economical operation of a power conversion system. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system for providing power to an electrical grid comprising:
   a power converter coupled to and configured to receive power generated by a direct current (DC) power source;
   a contactor coupled to said power converter and said electrical grid and configured to selectively electrically couple said power converter to said electrical grid; and
   a system controller communicatively coupled to said power converter and said contactor, said system controller comprising a memory device, said system controller configured to:
      close said contactor to electrically couple said power converter to said electrical grid when a DC voltage provided to said power converter has remained higher than a predefined voltage level until a first timer expires after a first predefined length of time value stored within said memory device;
      activate said power converter with said contactor closed when the DC voltage provided to said power converter has remained higher than the predefined voltage level for the first predefined length of time value;
      deactivate said power converter, while maintaining said contactor in the closed position, when an alternating current (AC) power output of said power converter has remained lower than a predefined power level until a second timer expires after a second predefined length of time value stored within said memory device;
      maintain said contactor in the closed position until a contactor open-delay expires after a third predefined length of time value stored within said memory device; and open said contactor when the DC voltage provided to said power converter has remained lower than the predefined voltage level subsequent expiration of the third predefined length of time.

2. The power conversion system in accordance with claim 1, wherein said DC power source comprises a photovoltaic (PV) array.

3. The power conversion system in accordance with claim 1, wherein said system controller is further configured to determine if the DC voltage provided to said power converter is greater than the predefined voltage level.

4. The power conversion system in accordance with claim 1, wherein said system controller is further configured to determine the AC power output of said power converter.

5. The power conversion system in accordance with claim 1, wherein said power converter comprises a two-stage power converter.

6. The power conversion system in accordance with claim 1, wherein said memory device further configured to store at least one of the predefined voltage level and the predefined power level.

7. The power conversion system in accordance with claim 6, wherein said system controller is configured to monitor the third predetermined length of time value that defines the period of time said contactor is closed.

8. The power conversion system in accordance with claim 7, wherein said system controller is further configured to open said contactor when the DC voltage provided to said power converter has remained lower than the predefined voltage level for the second predefined length of time value and the length of time said contactor has been closed exceeds the third predefined length of time value.

9. A method for operating a power conversion system, the power conversion system including a power converter and a contactor configured to selectively electrically couple the power converter to an electrical grid, said method comprising:
   determining that a direct current (DC) voltage provided to the power converter has remained higher than a predefined voltage level until a first timer expires after a stored first predefined length of time value;
   closing the contactor to electrically couple the power converter to the electrical grid when a DC voltage provided to the power converter has remained higher than a predefined voltage level for the first predefined length of time value;
   activating the power converter to convert the DC voltage input to an alternating current (AC) voltage output with the contactor closed and when the DC voltage provided to the power converter has remained higher than the predefined voltage level for the first predefined length of time value;
   determining an AC power output of the power converter;
   discontinuing operation of the power converter comprising maintaining the contactor in the closed position and turning-off the power converter when the AC power output has remained lower than a predefined power level until a second timer expires after a stored second predefined length of time value;
   monitoring a length of time the contactor is closed; and
   opening the contactor when the DC voltage provided to the power converter has remained lower than the predefined voltage level for the second predefined length of time value and the length of time the contactor has been closed exceeds a stored contactor-open delay value.

10. The method in accordance with claim 9, wherein:
    determining that the DC voltage is higher than a predefined voltage level comprises measuring a DC bus voltage within the power converter; and
    activating the power converter comprises activating a DC to AC inverter included within the power converter when the DC bus voltage is greater than the predefined voltage level.

11. A system controller coupled to, and configured to control operation of, a power conversion system that includes a power converter coupled to a photovoltaic (PV) array and a contactor configured to selectively electrically couple the power converter to an electrical grid, said system controller comprising a memory device, said system controller configured to:
    determine that a direct current (DC) voltage provided to the power converter has remained higher than a predefined voltage level until a first timer expires after a first predefined length of time value stored within said memory device;
    close the contactor to electrically couple the power converter to the electrical grid when a DC voltage provided to the power converter has remained higher than a predefined voltage level for the first predefined length of time value;
    activate the power converter to convert the DC voltage input to an alternating current (AC) voltage output with the contactor closed and when the DC voltage provided to the power converter has remained higher than the predefined voltage level for the first predefined length of time value;
    determine an AC power output of the power converter;
    discontinue operation of the power converter, while maintaining the contactor in a closed position, when the AC power output has remained lower than a predefined power level until a second timer expires after a second predefined length of time value stored within said memory device;
    maintain the contactor in the closed position until a contactor open-delay expires after a third predefined length of time value stored within said memory device; and
    open the contactor when the DC voltage provided to the power converter has remained lower than the predefined voltage level subsequent the third predefined length of time.

12. The system controller in accordance with claim 11, further configured to:
    monitor the third predetermined length of time that defines the period of time the contactor is closed; and
    open the contactor when the DC voltage provided to the power converter has remained lower than the predefined voltage level for the second predefined length of time value and the third length of time the contactor has been closed exceeds the third predefined length of time value.

13. The system controller in accordance with claim 11, further configured to operate a two-stage power converter.

14. The system controller in accordance with claim 13, further configured to:
    measure a DC bus voltage provided to a DC to AC inverter included within the two-stage power converter; and
    operate the DC to AC inverter when the DC bus voltage is above the predefined voltage level and the output of the DC to AC inverter is above the predefined power level.

* * * * *